United States Patent
Lett et al.

(10) Patent No.: US 7,453,626 B2
(45) Date of Patent: Nov. 18, 2008

(54) FOUR-WAVE MIXING SOURCE OF SQUEEZED LIGHT FOR IMAGE PROCESSING AND INTERFEROMETRY

(75) Inventors: Paul D. Lett, Gaithersburg, MD (US); Colin F. McCormick, Washington, DC (US); Vincent Boyer, Rockville, MD (US)

(73) Assignee: The United States of America as represented by the Secretary of Commerce, Washington, DC (US)

( * ) Notice: Subject to any disclaimer, the term of this patent is extended or adjusted under 35 U.S.C. 154(b) by 0 days.

(21) Appl. No.: 12/036,791

(22) Filed: Feb. 25, 2008

(65) Prior Publication Data

US 2008/0212166 A1 Sep. 4, 2008

Related U.S. Application Data

(60) Provisional application No. 60/904,287, filed on Mar. 1, 2007.

(51) Int. Cl.
*G02F 1/39* (2006.01)
(52) U.S. Cl. .............................. 359/330; 359/326
(58) Field of Classification Search .......... 359/326–332

See application file for complete search history.

(56) References Cited

U.S. PATENT DOCUMENTS

| | | | |
|---|---|---|---|
| 6,867,903 B2* | 3/2005 | Imajuku et al. | 359/330 |
| 2006/0285197 A1* | 12/2006 | McKinstrie | 359/333 |
| 2007/0230518 A1* | 10/2007 | Watanabe | 372/22 |
| 2008/0130097 A1* | 6/2008 | McKinstrie | 359/330 |

* cited by examiner

*Primary Examiner*—M. R. Connelly-Cushwa
(74) *Attorney, Agent, or Firm*—Stites & Harbison PLLC; Ross F. Hunt, Jr.

(57) ABSTRACT

A four-wave mixing squeezed light source includes: a mixing medium having chi(3) non-linear characteristics including two atomic ground states coupled to each other by transitions through optically-excited states; a pump beam having a polarization and a frequency, said frequency being near the ground-to-excited atomic transition but far enough from the atomic transition such that the pump beam is substantially unabsorbed; and a probe beam having a polarization that is orthogonal with respect to the pump beam polarization, the probe beam having a frequency of the pump beam frequency plus or minus a frequency splitting of the two atomic ground states. The mixing medium, the pump beam and the probe beam interact to produce a phase conjugate beam having a polarization that is orthogonal to the pump beam polarization, such that the beams are non-degenerate with the pump beam, and the probe beam is amplified.

7 Claims, 1 Drawing Sheet

FOUR-WAVE MIXING SOURCE OF SQUEEZED LIGHT FOR IMAGE PROCESSING AND INTERFEROMETRY

CROSS-REFERENCE TO RELATED APPLICATIONS

This application claims priority to U.S. provisional patent application No. 60/904,287, entitled A FOUR-WAVE MIXING SOURCE OF SQUEEZED LIGHT FOR IMAGE PROCESSING AND INTERFEROMETRY, filed on Mar. 1, 2007, the disclosure of which is hereby incorporated by reference.

BACKGROUND OF THE INVENTION

1. Field of the Invention

The present invention relates to quantum imaging using correlated or entangled beams of light to enhance image processing and to the use of squeezed light in interferometry.

2. Description of Prior Art

The field of "quantum imaging," using correlated or entangled beams of light to enhance image processing, holds promise for noiseless amplification of images and improvements in both the obtainable resolution and weak-image detection sensitivity. Many of these applications have already been demonstrated in some form using chi(2) nonlinear crystals. These demonstrations have typically been substantially limited by the need to angle-tune the nonlinear crystal to phase match a small range of spatial frequencies, or by the placement of the non-linear crystal inside of a resonant cavity, which again restricts the usable spatial modes.

Quantum information processing can be carried out with continuous variables in a parallel fashion to the ways in which binary data is processed. The basis of this approach is to use physical quantities with a continuous spectrum such as the quadrature amplitudes of a light field, rather than binary quantities such as the polarization state of the field.

Continuous variable quantum systems can involve many photons in one light mode, and this potentially has some advantage over single-photon systems. The possibility of higher data rates and simpler processing based upon standard telecommunication techniques exists. A continuous variable quantum communication system can be based on homodyne detection instead of single-photon detection. This has the advantage of producing a measurement outcome for each pulse of light rather than the probabilistic measurements of single-photon detectors.

An essential tool for implementing quantum information processing is some sort of memory for the storing the quantum bits, or qubits. A storage element for light, and in particular a quantum memory that retains the information regarding the detailed quantum state of the light is useful for quantum communication applications as well as quantum information processing protocols. The basic idea behind an implementation of a quantum memory is to slow the propagation of a pulse of light through a medium by controlling the linear dispersion of the medium at the frequencies near the central frequency of the light pulse in question. A narrow gain feature has accompanying it a dispersion or change in the index of refraction in the frequency neighborhood of the gain. The central region of the dispersion feature has a linear change in the index of refraction, which leads to a reduced group velocity for the pulse propagation. By changing the gain of the medium by controlling the pump intensity the slope of the linear dispersion region changes, thus changing the group velocity. Reducing the pump intensity to zero while the pulse of light is contained within the medium can cause the state of the light in the optical pulse to be stored in the ground-state coherences of the atomic populations that result from the ultimate absorption of the pulse as the pump light is turned off. The light pulse can then be "reconstituted" with all of its original quantum state information by turning the pump light back on. The mixing of the atoms by their thermal motion will cause the information to eventually become scrambled and lost to this decoherence mechanism. Similar optical memories have been demonstrated based on the concept of electromagnetically-induced transparency [see, for example, D. Phillips, A. Fleischhauer, A. Mair, R. Walsworth, and M. Lukin, "Storage of light in atomic vapor," Phys. Rev. Lett. 86, 783 (2001)], wherein a transparency feature within an region of absorption in an atomic vapor is manipulated in a similar way.

A number of other information-processing protocols have been demonstrated, including quantum cloning and the demonstration of continuous-variable coherent-state quantum key distribution.

A discussion of quantum imaging applications is given in the following book: ["Quantum Imaging," M. Kolobov, ed., (Springer, N.Y., 2007)]. A book on quantum information processing in this context is: ["Quantum Information with Continuous Variables of Atoms and Light," N. J. Cerf, G. Leuchs, and E. S. Polzik, eds., (Imperial College Press, London, 2007)]. A review article on quantum information and communication applications is: ["From quantum cloning to quantum key distribution with continuous variables: a review," N. Cerf and P. Grangier, J. Opt. Soc. Am. B 24, 324 (2007)].

A process to produce strongly squeezed light is desired. Particularly, a process to produce strongly squeezed light without the use of a cavity, in multiple spatial modes, and at low temporal frequencies, is desired.

While four-wave mixing was the first nonlinear optical process to be used to demonstrate the generation of squeezed states of light, the amount of squeezing obtained by this technique has been quite modest. Generally, only about −1 dB or less of squeezing has been obtained through four-wave mixing (4WM) processes, with the strongest effect of −2.2 dB obtained with the use of a laser-cooled atom source.

Optical parametric oscillators (OPOs) with a cavity built around a chi(2) material have produced much better and more reliable squeezing. Up to −9.7 dB of intensity-difference squeezing has been measured using an OPO. However, a disadvantage of OPOs for imaging applications is the requirement of a cavity. Also, up to −10 dB of quadrature squeezing has been observed from an OPO.

Parametric down-conversion (PDC) with a chi(2) material has the advantage of typically being used in a single pass geometry, but requires a high-intensity, pulsed pump source to obtain any significant gain.

BRIEF SUMMARY OF THE INVENTION

Better understanding may be had by referring to the following detailed description of exemplary embodiments and drawings.

According to one aspect of the invention, a four-wave mixing squeezed light source includes: a mixing medium having chi(3) non-linear characteristics including two atomic ground states coupled to each other by transitions through optically-excited states; a means for injecting into the mixing medium a pump beam having a pump beam polarization and a pump beam frequency, the pump beam frequency being near the ground-to-excited atomic transition but far enough from the atomic transition such that the pump beam is substantially unabsorbed; and a means for injecting into the mixing medium a probe beam having a probe beam polarization that is orthogonal with respect to the pump beam polarization, the probe beam having a probe beam frequency of substantially at least one of: (i) the pump beam frequency minus a frequency splitting of the two atomic ground states; and (ii) the pump beam frequency plus the frequency splitting of the two atomic ground states. The mixing medium, the pump beam and the probe beam interact to produce a phase conjugate beam having a phase conjugate beam frequency range and a phase conjugate beam polarization that is orthogonal to the pump beam polarization, such that the probe beam polarization and the phase conjugate beam polarization are non-degenerate with the pump beam, and the probe beam is amplified.

The system is understood as a 4-level atomic level structure; the two ground states and two closely-spaced excited states that are separated from the ground states by optical transitions. The symmetry of driving the system from a ground state to an excited state (or at least off-resonance but near the excited state) with one polarization (pump photon) and down with the orthogonal polarization (probe), then up with another pump photon (and back to the original state with the conjugate photon) means that the second excited state cannot have the same internal symmetries as the first.

According to one implementation, the probe beam has a probe beam direction, the pump beam has a pump beam direction, and the phase conjugate beam has a phase conjugate beam direction. The probe beam is injected into the mixing medium in substantially the same direction and at an angle of substantially one degree to the pump beam. The probe beam direction and the phase conjugate beam direction are non-degenerate with the pump beam.

The mixing medium may include a Rb vapor contained in a vapor cell substantially 1 cm long at approximately 130° C. (in the range of 110° C. to 140° C.). The means for injecting the pump beam may include an infrared laser at an infrared frequency and tuned substantially 1 GHz to the blue of the D1 line in $^{85}$Rb of said Rb vapor, such that a ground state splitting of $^{85}$Rb at substantially 3 GHz is large enough to move the probe beam frequency range and the phase conjugate beam frequency range outside of a Doppler absorption profile near the infrared frequency of the pump beam, and such that the probe beam frequency range and the phase conjugate beam frequency range fit between absorption features from another $^{85}$Rb ground state and absorption features of a $^{87}$Rb isotope.

According to another feature, the four-wave mixing squeezed light source further includes a pump beam source and an intensity noise eater placed on the pump beam source for increasing effectiveness of the four-wave mixing squeezed light source at normal video detection rates.

According to a second aspect of the invention, a method of producing four-wave mixing squeezed light, includes the steps of: providing a mixing medium having chi(3) non-linear characteristics including two atomic ground states coupled to each other by transitions through optically-excited states; injecting into the mixing medium a pump beam having a pump beam polarization and a pump beam frequency, the pump beam frequency being near the ground-to-excited atomic transition but far enough from the ground-to-excited atomic transition such that the pump beam is substantially unabsorbed; and injecting into the mixing medium a probe beam having a probe beam polarization that is orthogonal with respect to the pump beam polarization, the probe beam having a probe beam frequency of substantially at least one of: (i) the pump beam frequency minus a frequency splitting of the two atomic ground states; and (ii) the pump beam frequency plus the frequency splitting of the two atomic ground states. Again, the mixing medium, the pump beam and the probe beam interact to produce a phase conjugate beam having a phase conjugate beam polarization that is orthogonal to the pump beam polarization, such that the probe beam polarization and the phase conjugate beam polarization are non-degenerate with the pump beam, and the probe beam is amplified.

In accord with an important implementation of the method, the step of injecting into the mixing medium the probe beam includes injecting the probe beam into the mixing medium at an angle of substantially one degree to the pump beam in substantially the same direction as said pump beam.

Other features and advantages of the invention will be set forth in, or apparent from, the detailed description of preferred embodiments of the invention found below.

DETAIL DESCRIPTION OF THE DRAWINGS

Exemplary embodiments of the invention will now be described by way of example only with reference to the accompanying drawings in which.

DESCRIPTION OF EXEMPLARY
EMBODIMENTS OF THE INVENTION

Entanglement is a quantum mechanical phenomenon in which the quantum states of two objects have to be described with reference to one another, even though the individual objects may be separated in space. This leads to strong correlations between the observable properties of the two systems. In fact, the correlations can be stronger than what would be allowed by classical descriptions of the systems in question.

Continuous variable quantum information processing using single-mode squeezed states with linear-optics circuits can be used to perform a large number of informational manipulations (other ingredients such as Schrodinger cat states are needed to implement universal quantum computing). In addition, in continuous variable optical systems the Bell measurement can be realized deterministically with a balanced beam splitter followed by homodyne measurement. Such measurements on entangled states are intrinsic to quantum information processing with more than one bit of information. Since homodyne detection can work at high speed this can be advantageous for quantum information processing, where loss of information due to decoherence can be a problem.

Figure 1:
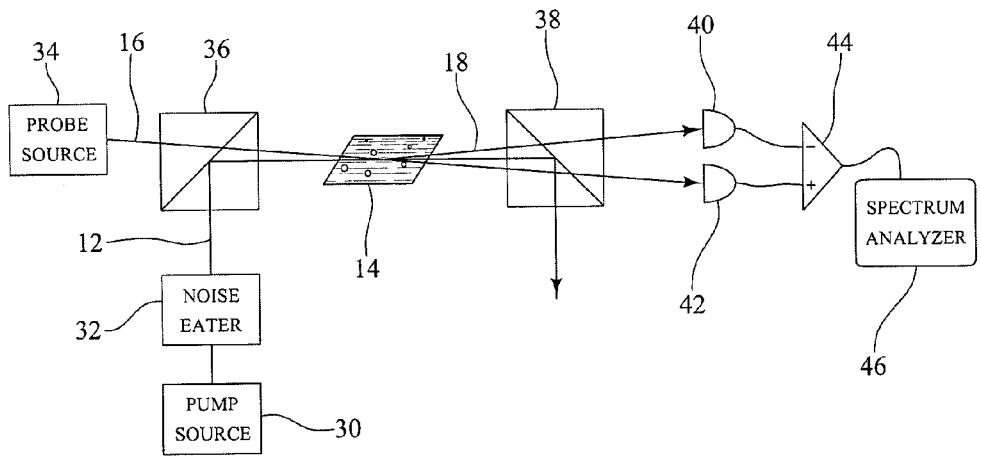
FIG. 1 is a system diagram of a four-wave mixing squeezed light source according to a preferred embodiment of the invention.

FIG. 1 shows an exemplary embodiment of a four-wave mixing (4WM) squeezed light source generally denoted 10, including a single unidirectional pump beam 12, a chi(3) non-linear mixing medium 14, a probe beam 16 and a phase conjugate beam 18. Additionally, the exemplary 4WM squeezed light source 10 includes: a pump beam source 30, an intensity noise eater 32, a probe beam source 34, and a first beam splitter 36, a second beam splitter 38, a first detector 40, a second detector 42, a differencing amplifier 44 and a radio-frequency electronic spectrum analyzer 46.

It should be noted that the geometry described herein may be described as a "forward 4WM." However, one of skill in the art will understand that the spirit and scope of the invention described and claimed herein would also include a "backward 4WM" geometry, wherein the pump beam 12 is counter-propagating (two beams aimed at each other or one reflected back on itself) rather than the unidirectional beam of the "forward 4WM" described herein.

The pump beam source 30 is selected to produce the single unidirectional pump beam 12 having characteristics specific to the chi(3) non-linear mixing medium 14. More specifically, the pump beam source 30 is selected to produce a pump beam 12 that is tuned to the blue of a selected atomic transition of the chi(3) non-linear mixing medium 14, as long as the atomic structure allows a "double-lambda" transition configuration. In the exemplary embodiment of a 4WM squeezed light source 10 using a Rb vapor as the non-linear mixing medium 14, as described below, the pump beam source 30 is preferably a 300 mW infrared laser producing a pump beam 12 having a wavelength near 795 nm tuned to the blue of the D1 atomic transition in Rb. For other chi(3) non-linear mixing medium atoms, such as sodium, the pump beam source 30 would be selected to produce a pump beam 12 having a wavelength in the visible range.

The probe beam source 34 is preferably an acousto-optical modulator fed with a stable radio-frequency source tuned to a frequency approximately at the ground state splitting of the atom in question (approximately 3 GHz when using rubidium) and used to frequency-shift a portion of the pump beam 12 by this frequency. Thus, the frequency of the probe beam 16 falls in a narrow window defined by the frequency of the pump beam 12 plus or minus the ground state splitting. This produces a probe beam 16 that is phase-stable with respect to the pump beam 12.

The first beam splitter 36 is a polarizing beam splitter used to combine the pump beam 12 and probe beam 16 before entering the chi(3) non-linear mixing medium 14.

The second beam splitter 38 is also a polarizing beam splitter, but is used to separate the pump beam 12 from the probe beam 16 and the phase conjugate beam 18 after passing through the chi(3) non-linear mixing medium 14.

The first detector 40 and the second detector 42 are selected to have high quantum efficiency at the wavelength being used. In the exemplary embodiment of a 4WM squeezed light source 10, the first detector 40 and second detector 42 are preferably silicon photodiodes having high quantum efficiency at the Rb wavelength.

The differencing amplifier 44 is preferably a low-noise differencing amplifier. The differencing amplifier 44 receives the signals from the first detector 40 and the second detector 42 to produce a difference signal.

The radio-frequency electronic spectrum analyzer 46 receives the difference signal and provides a spectrum analysis output of the relative intensity squeezing of the 4WM squeezed light source 10.

In use, the probe beam 16 is injected into the non-linear mixing medium 14 at a small angle (~1 degree) and at an orthogonal polarization to the pump beam 12. The interaction between the pump beam 12, the probe beam 16 and the chi(3) non-linear mixing medium 14 produce the phase conjugate beam 18, also having an orthogonal polarization with respect to the pump beam 12. Thus, probe beam 16 and phase conjugate beam 18 have directions, frequencies and polarizations that are non-degenerate with the pump beam 12. Further, the non-linear mixing medium 14 is selected first, and then the pump beam 12 is selected to have a frequency far enough from the atomic transitions so that the pump beam 12 is not strongly absorbed by the non-linear mixing medium 14. The probe beam 16 is then selected to have a frequency that matches the frequency splitting between the lower two atomic levels of the system. The pump plus or minus the probe frequency as well as the pump minus or plus the conjugate frequency will close the "double lambda" system; energy will be conserved as twice the pump frequency will equal the probe frequency plus the conjugate frequency.

For instance, in an exemplary system in which Rb vapor is utilized as the non-linear mixing medium 14, the Rb vapor is preferably contained in a vapor cell approximately 1 cm long at approximately 130 C. The exemplary system, using an infrared laser as the pump beam source 30, is "tuned" ~1 GHz to the blue of the D1 line in $^{85}$Rb. A ground state splitting of $^{85}$Rb at ~3 GHz is large enough to move the frequency of the probe beam 16 and the frequency of the conjugate beam 18 outside of the Doppler absorption profile of the Rb vapor near the infrared frequency of the pump beam 12. Additionally, in the exemplary system, the frequency of the probe beam 16 and the frequency of the conjugate beam just fit between the absorption features from the other $^{85}$Rb ground state and those of the $^{87}$Rb isotope.

The length of the vapor cell is, to some extent, determined by the overlap of the pump beam 12 and the probe beam 16 in the cell, and, thus, also dependent on the physical size of these beams. Typically, the beams are less than 1 millimeter in diameter, and, thus, a much longer cell means that these beams do not overlap as well throughout the cell. The vapor cell is "tuned" by adjusting the temperature (e.g., a longer cell would use a lower temperature). The number of atoms that the beam encounters needs to stay near an optimum—a short cell requires a warmer cell temperature, implying a higher density of rubidium vapor in the cell, so that the column density times the cell length is approximately the same in all cases. Other properties of the vapor cell are: a Brewster angle cell (with windows at the Brewster angle for the probe polarization); or, alternatively, a cell with flat windows and anti-reflection coatings on the windows. In both cases, the desire is to reduce the losses for the probe beam 16 and the conjugate beam 18.

Figure 2:
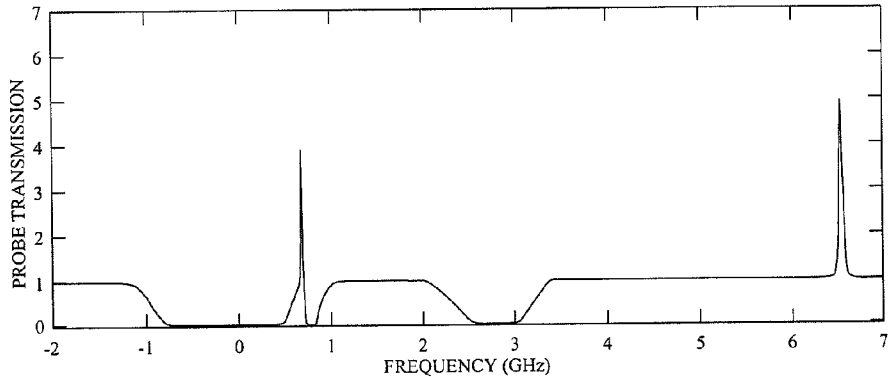
FIG. 2 is a gain/loss diagram for the system of FIG. 1.

FIG. 2 is a gain/loss diagram of the exemplary 4WM squeezed light source 10 of FIG. 1 using an infrared laser as the pump beam source 30 and a cell with only $^{85}$Rb vapor as the non-linear mixing medium 14. Gain/loss 20 is plotted versus frequency 22 of the probe beam 16 for a fixed tuning of the pump beam source 30 of approximately 800 MHz blue of the 85Rb D1 F=2 to F'=3 transition. The transmission of the probe beam 16 through the non-linear mixing medium 14, as measured by the detectors 40, 42 is shown. A transmission of 1 indicates no gain or loss, transmissions greater than 1 indicate gain, and transmissions less than 1 indicate loss. The regions of probe gain contain the frequency regions in which squeezed light is generated. For FIG. 2, the pump beam 12 is tuned to a frequency around 3.6 GHz, which is approximately half-way between the narrow peaks.

With respect to the amplification of the probe beam, it is noted that a gain of 5 with a probe beam 16 having a power of 1 will produce a probe beam 16 having a power of 5 and a phase conjugate beam 18 having a power of 4. In other words, both the probe beam 16 and the phase conjugate beam 18 have 4 units of power added. Further, the light added to both beams is substantially identical in many properties. The higher the gain, the better matched the two beams are because the injected light becomes a smaller and smaller fraction of the output probe beam.

It should be noted that a cell with a natural abundance of both stable rubidium isotopes also functions equally well.

Advantageously, the exemplary 4WM squeezed light source 10 produces stronger intensity-difference squeezing between two beams than has previously been demonstrated in an atomic vapor system. Still further, the exemplary 4WM squeezed light source provides a single-pass, no-cavity implementation that easily produces squeezing in multiple spatial modes in this configuration, and can also be made to produce quadrature squeezing as well.

The exemplary 4WM squeezed light source 10 described above will produce more than −8 dB of squeezing (and −8.8 dB of squeezing upon subtraction of known extraneous noise (e.g., scattered light from the pump beam source 30)). If projected to a somewhat idealized lossless system, the exemplary 4WM squeezed light source 10 generates −11 dB of intensity-difference squeezing at the source. Current low frequency limits are 4 kHz at −8 dB squeezing.

In order to make the exemplary 4WM source 10 more useful at normal video detection rates (approximately 30 Hz), also shown in FIG. 1 is an intensity "noise eater" 32, placed into the pump beam 12. Improving the stability of the phase locking of the probe beam 16 to the pump beam 12 will also substantially improve the low-frequency response.

The exemplary 4WM squeezed light source 10 is a preferred choice for manipulation and processing of optical beams with quantum characteristics (squeezed light) in higher-order spatial modes. Virtually all experiments performed using chi(2) materials contained in a cavity are easier to accomplish and more successful using the exemplary 4WM source. The following are exemplary applications for the use of the exemplary 4WM squeezed light source 10 described above.

1. Noiseless Image Amplification

A phase-insensitive amplifier will always add noise (spontaneous emission) to a signal. The exemplary 4WM squeezed light source 10, as a phase-sensitive amplifier, overcomes the noise limitation because it produces quantum-correlated signal and idler (or probe and conjugate) beams, and the correlation can be used for noise cancellation. Of course, while one quadrature component of the signal is amplified, the orthogonal quadrature will be deamplified.

2. Superresolution and Faint-Object Amplification in Microscopy

A large class of measurements are limited not be diffraction, but by the quantum fluctuations in the light beams used in the experiment. "Superresolution" techniques are able to work beyond the Rayleigh "limit" (not truly a limit to resolution, but a good guidepost for classical resolution). In the case of a finite sized object imaged by a lens through an aperture onto a plane, the Fourier transform in the focal (or Fourier) plane is an analytic function. The analytic continuation of the object spectrum outside of the spatial-frequency band that is passed by the aperture, in principle, allows for the recovery of resolution beyond the limit that would have been set by the aperture. Such a reconstructed image is obviously very sensitive to the noise in the detected image, and thus imaging with squeezed light offers an advantage. The exemplary 4WM squeezed light source 10 functions better than a chi(2) medium source in a superresolution and faint-object amplification application, and, additionally, is easier to implement.

3. Phase-Sensitive Amplifier

By pumping (injecting high-intensity beams) on the sideband frequencies in the geometry of the exemplary configuration, light at the center frequency (the pump in the exemplary configuration) can be amplified in a phase-sensitive manner. This modified 4WM squeezed light source produces degenerate conjugate and probe beams that constitute a quadrature-squeezed beam at the center frequency, or a phase-sensitive amplifier for this light. Advantageously, quadrature squeezed light improves the sensitivity of optical interferometers.

4. Quantum Computing

The exemplary 4WM squeezed light source 10 produces squeezed light that is narrowband and matched to the absorption frequency of atoms that have been Bose condensed. In the context of quantum information processing, such a source can be used to entangle photons and atoms, and transmit quantum bits of information, facilitating the teleportation of bits of quantum information (or images as many bits in parallel) and storage in atomic ensembles. The exemplary 4WM squeezed light source 10 is matched for using Rb vapor as a storage media.

5. Similar Level Schemes in Other Alkalis and Solid State Materials

The exemplary 4WM squeezed light source 10 is suitable for extension to similar level schemes in other alkalis and solid state materials.

Although the invention has been described above in relation to exemplary embodiments thereof, it will be understood by those skilled in the art that variations and modifications can be effected in these exemplary embodiments without departing from the scope and spirit of the invention.

What is claimed is:

1. A four-wave mixing squeezed light source comprising:
a mixing medium having chi(3) non-linear characteristics including two atomic ground states coupled to each other by transitions through optically-excited states;
a means for injecting into said mixing medium a pump beam having a pump beam polarization and a pump beam frequency, said pump beam frequency being near the ground-to-excited atomic transition but far enough from the ground-to-excited atomic transition such that the pump beam is substantially unabsorbed; and
a means for injecting into said mixing medium a probe beam having a probe beam polarization that is orthogonal with respect to the pump beam polarization, the probe beam having a probe beam frequency of substantially at least one of: (i) said pump beam frequency minus a frequency splitting of the two atomic ground states; and (ii) said pump beam frequency plus said frequency splitting of the two atomic ground states;
said mixing medium, said pump beam and said probe beam interacting to produce a phase conjugate beam having a phase conjugate beam frequency range and a phase conjugate beam polarization that is orthogonal to the pump beam polarization, such that said probe beam polarization and said phase conjugate beam polarization are non-degenerate with the pump beam, and the probe beam is amplified.

2. The four-wave mixing squeezed light source of claim 1:
wherein said probe beam has a probe beam direction, said pump beam has a pump beam direction, and said phase conjugate beam has a phase conjugate beam direction;
wherein said probe beam is injected into said mixing medium in substantially the same direction and at an angle of substantially one degree to the pump beam.

3. The four-wave mixing squeezed light source of claim 2, wherein said mixing medium comprises a Rb vapor contained in a vapor cell.

4. The four-wave mixing squeezed light source of claim 3, wherein said means for injecting the pump beam comprises an infrared laser at an infrared frequency and tuned substantially 1 GHz to the blue of the D1 line in $^{85}$Rb of said Rb vapor, such that a ground state splitting of $^{85}$Rb at substantially 3 GHz is large enough to move the probe beam frequency range and the phase conjugate beam frequency range outside of a Doppler absorption profile near the infrared frequency of the pump beam, and such that the probe beam frequency range and the phase conjugate beam frequency range fit between absorption features from another $^{85}$Rb ground state and absorption features of a $^{87}$Rb isotope.

5. The four-wave mixing squeezed light source of claim 1, further comprising a pump beam source and an intensity noise eater placed on the pump beam source for increasing effectiveness of the four-wave mixing squeezed light source at normal video detection rates.

6. A method of producing four-wave mixing squeezed light, comprising the steps of:

providing a mixing medium having chi(3) non-linear characteristics including two atomic ground states coupled to each other by transitions through optically-excited states;

injecting into said mixing medium a pump beam having a pump beam polarization and a pump beam frequency, said pump beam frequency being near the ground-to-excited atomic transition but far enough from the ground-to-excited atomic transition such that the pump beam is substantially unabsorbed; and injecting into said mixing medium a probe beam having a probe beam polarization that is orthogonal with respect to the pump beam polarization, the probe beam having a probe beam frequency of substantially at least one of: (i) said pump beam frequency minus a frequency splitting of the two atomic ground states; and (ii) said pump beam frequency plus said frequency splitting of the two atomic ground states;

said mixing medium, said pump beam and said probe beam interacting to produce a phase conjugate beam having a phase conjugate beam polarization that is orthogonal to the pump beam polarization, such that said probe beam polarization and said phase conjugate beam polarization are non-degenerate with the pump beam, and the probe beam is amplified.

7. The method of claim 6, wherein said step of injecting into said mixing medium said probe beam includes injecting said probe beam into said mixing medium at an angle of substantially one degree to the pump beam in substantially the same direction as said pump beam.

* * * * *